United States Patent Office 3,025,234
Patented Mar. 13, 1962

3,025,234
WELL DRILLING FLUID AND PROCESS
Peter J. Canterino, Bartlesville, Okla., assignor to Phillips
Petroleum Company, a corporation of Delaware
No Drawing. Filed Sept. 3, 1957, Ser. No. 683,427
39 Claims. (Cl. 252—8.5)

This invention relates to drilling fluids. In one aspect it relates to drilling fluids, such as the aqueous and emulsion types, used in drilling oil and gas wells, or other deep wells. In another aspect, it relates to a method of drilling such wells with a novel drilling fluid characterized by a desirably low filtration rate or water loss, and other desirable rheological properties. In a further aspect it relates to a method of controlling the filtration rate of a drilling fluid by treating the same with a novel additive.

In the art of drilling wells to tap subterranean deposits, such as gas or oil, especially when drilling by the rotary method or the percussion method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counterbalance formation pressures.

In addition to having desirable rheological properties such as viscosity and gel strength, it is very important that the drilling fluid exhibit a low rate of filtration or water loss, that is, the drilling fluid must prevent excessive amounts of fluid from flowing from the bore hole into the surrounding formation. The loss of water or other fluid from the drilling fluid is prevented by the formation of the filter cake which deposits from the drilling fluid and seals the wall of the bore hole. Where porous zones or fissures or cracks are encountered, the seal or filter cake must prevent rapid loss of fluid into the surrounding formation by filtration due to the pressure gradient. If the filtration rate is excessive, a thick filter cake can be formed whether or not the drilling fluid is circulating and whether or not drilling is in progress. Swelling and dispersion of shales can also be controlled by effectively sealing the wall of the bore hole with a drilling fluid having a low filtration rate.

Seepage of fluid from the formation into the bore hole is also prevented by the filter cake. If water, for example, filters or seeps into the formation penetrated, several problems arise; the producing formation may be contaminated by the water, permanently displacing the oil and block production; or, if the formation penetrated is of the heaving shale type, the latter may absorb water from the drilling fluid and by a caving or swelling action common to bentonitic materials, close the bore hole around the drill stem, choke off circulation of drilling fluid, and seize the drilling stem so that it twists in half.

Accordingly, an object of this invention is to provide a novel drilling fluid. Another object is to provide an improved method of drilling oil and gas wells, and other deep wells, using a drilling fluid which has been treated or conditioned so as to lessen the tendency of this drilling fluid to lose or gain water to or from the formation penetrated. A further object is to provide a novel drilling fluid, such as the aqueous or emulsion type, containing a small but effective amount of a water-soluble or dispersible polymer prepared by polymerizing vinyl-substituted heterocyclic nitrogen compounds with carboxy-containing comonomers having a terminal vinyl group and their hydrolyzable precursors. A still further object is to provide a method for controlling the water loss of a drilling fluid. Further objects and advantages of this invention will become apparent from the following discussion and appended claims.

Broadly, I have discovered the water loss or filtration rate of a drilling fluid can be substantially minimized or reduced by treating the drilling fluid with water-soluble or water-dispersible polymers of polymerizable vinyl-substituted heterocyclic nitrogen base compounds and copolymerizable carboxy-containing compounds having a terminal vinyl group, and their hydrolyzable carboxy-yielding precursors. These polymers can be in the form of acids or salts thereof.

The polymerizable heterocyclic compounds include five and six membered heterocyclic compounds containing a hetero nitrogen atom. These polymerizable heterocyclic nitrogen compounds are those containing a vinyl group, viz.,

where R is a hydrogen atom or a methyl group. One or two vinyl groups can be attached to the hetero ring, and also alkyl groups can be attached to the hetero ring as long as there are not more than 12 carbon atoms in the total of these alkyl groups. One oxygen atom can also be attached by a double bond to one of the carbon atoms in the hetero ring. Furthermore, one or two benzoid structures can be attached or fused to the hetero ring, including nuclear (ring) alkyl-substituted derivatives thereof (again, not more than 12 carbon atoms in the total of these alkyl groups), the ring of each benzoid structure being completed with any pair of vicinal carbon atoms in the hetero ring. This class is polymerizable heterocyclic nitrogen compounds can be represented broadly by the formulas:

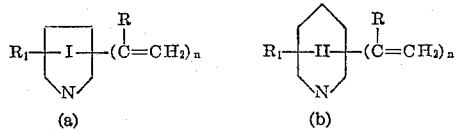

(a)          (b)

where I and II are selected from the group consisting of saturated and unsaturated hetero rings, $n$ is a positive integer from 1 to 2, R is selected from the group consisting of H and $CH_3$, $R_1$ is selected from the group consisting of H, alkyl groups (not more than 12 carbon atoms being present in the total of said alkyl groups), an oxygen atom attached by a double bond to one of the carbon atoms in the hetero ring, and those non-metallic atoms necessary to complete from 1 to 2 benzoid structures each of which is completed in part with any pair of vicinal carbon atoms in the hetero ring, said benzoid structures including nuclear (ring) alkyl-substituted benzoid rings (again, not more than 12 carbon atoms in the total of the alkyl substituents).

A more narrower class of polymerizable heterocyclic nitrogen compounds for preparing the polymers of this invention can be represented by the formulas:

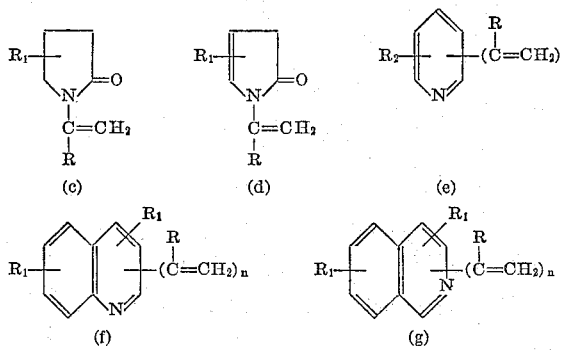

wherein $n$ is a positive integer from 1 to 2, R is selected from the group consisting of H and $CH_3$, and $R_1$ is selected from the group consisting of H and alkyl groups, not more than 12 carbon atoms being present in the total of said alkyl groups.

Typical heterocyclic nitrogen compounds which are applicable in the practice of this invention representatively include those of the pyrrolidine series (e.g., N-vinylpyrrolidine, 2-methyl-5-vinylpyrrolidone, etc.), those of the pyrroline series (e.g., N-vinylpyrroline, 2-vinylpyrroline, etc.), those of the pyrrole series (e.g., N-vinylpyrrole, 3-vinylpyrrole, 4-vinylpyrrole, 3-methyl-4-vinylpyrrole, 2,4-dimethyl-3-vinylpyrrole, etc.), those of the pyrrolidone series (e.g., N-vinyl-2-pyrrolidone, N - vinyl - 5 - methyl - 2 - pyrrolidone, 3 - vinylpyrrolidone, 3-ethyl-4-vinyl-2-pyrrolidone, etc.), those of pyrrolone series (e.g., N-vinyl-2-pyrrolone, 3-vinyl-2-pyrrolone, etc.), those of the indole series (e.g., N-vinylindole, 3-methyl-2-vinylindole, N-vinyl-2,3-dimethylindole, 7-methyl-3-vinylindole, etc.), those of the indolenine series (e.g., 3-vinylindolenine, 2-vinyl-3,6-dimethylindolenine, etc.), those of the indoline series (e.g., N - vinylindoline, 2,7 - dimethyl - 2 - vinylindoline, etc.), those of the carbazole series (e.g., N-vinylcarbazole, N - vinyl - 3,7 - dimethylcarbazole, N - vinyl - 2 - methyl-3,6-diethylcarbazole, etc.), those of the piperidine series (e.g., N-vinylpiperidine, 2-vinylpiperidine, 3-vinylpiperidine, 2,3 - dimethyl - 5 - vinylpiperidine, 3,4 - dimethyl-5-butyl-6-vinylpiperidine, N-vinyl-3-propylpiperidine, 3, N-divinyl-5-ethylpiperidine, etc.), those of the pyridone series (e.g., N - vinyl - 3 - pyridone, 5 - vinyl - 2 - pyridone, N-vinyl-2-methyl-4-pyridone, etc.), those of the piperidone series (e.g., N-vinyl-4-piperidone, 2-vinyl-6-methyl-4-piperidone, N-vinyl-2-piperidone, etc.), those of the pyridine series (e.g., N-vinyl-1-2-dihydropyridine, N-vinyltetrahydropyridine, 2-vinylpyridine, 4-vinylpyridine, 2-vinyl-5-ethylpyridine, 5-methyl-2-vinylpyridine, 5-ethyl-2-vinylpyridine, 2-methyl-5-vinylpyridine, 3-ethyl-5-vinylpyridine, 4-methyl-3-vinylpyridine, 2-isopropenylpyridine, 5-propyl-2-isopropenylpyridine, 3-dodecyl-4,5-divinylpyridine, 2-decyl-5-isopropenylpyridine, 2-octyl-5-vinylpyridine, 2,4,6-trimethyl-5-vinylpyridine, 3,4,5,6-tetramethyl - 2 - vinylpyridine, 3,5 - diisopropenylpyridine, 2,6-diethyl-4-vinylpyridine, 2,4-dimethyl-5,6-dipentyl - 3 - vinylpyridine, 2 - isopropyl - 4 - nonyl - 5 - vinylpyridine, 2-methyl-5-undecyl-6-vinylpyridine, 2,5-divinylpyridine, 3-methyl-2,5-divinylpyridine, etc.), those of the quinoline series (e.g., 2-vinylquinoline, 2-methyl-5-vinylquinoline, 2,8-dimethyl-3-vinylquinoline, 2,3,8-trimethyl-5-vinylquinoline, 2-vinyltetrahydroquinoline, 8-ethyl-2-vinylquinoline, 4-hexyl-5-vinylquinoline, 2,5-divinylquinoline, etc.), those of the isoquinoline series (e.g., 1-vinylisoquinoline, 5-methyl-1-isopropenylisoquinoline, 1,8-divinylisoquinoline, 3,5-divinylisoquinoline, 6,7-dimethyl-3,5-divinylisoquinoline, etc.), and the like.

The carboxy-containing comonomers, and their hydrolyzable precursors, copolymerizable with one or more of the above-mentioned polymerizable vinyl-substituted heterocyclic nitrogen compounds, can be represented by the formula:

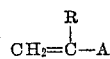

$$CH_2=\overset{R}{\underset{|}{C}}-A$$

where R is selected from the group consisting of H, lower alkyl (e.g., $CH_3$, $C_2H_5$, $C_3H_7$, etc.), Cl, COOH, CN, $CONH_2$, COOR″ and $CH_2COOR'$ (R′ being a lower alkyl), and A is selected from the group consisting of COOH, CN, $CONH_2$, COOR″ (R″ being a lower alkyl), and COOM, said M being a monovalent salt-forming radical selected from the group consisting of alkali metal, such as sodium or potassium, and ammonium radicals.

Typical carboxylic acids and their hydrolyzable acid-forming precursors representatively include unsaturated aliphatic carboxylic acids, such as acrylic acid, methacrylic acid, ethacrylic acid, propacrylic acid, 2-chloroacrylic acid, 2-cyanoacrylic acid, 2-carboxyacrylic acid, etc.; nitriles, such as acrylonitrile, methacrylonitrile, ethacrylonitrile, etc.; the corresponding amides, such as acrylamide, methacrylamide, ethacrylamide, 2-carboxylacrylamide, 2-cyanoacrylamide, 2-methylenemalonamide, etc.; esters, such as methyl acrylate, ethyl acrylate, propyl acrylate, butyl acrylate, methyl methacrylate, ethyl methacrylate, propyl methacrylate, butyl methacrylate, methyl ethacrylate, ethyl ethacrylate, 2-chloromethyl acrylate, methyl 2-carboxylacrylate, ethyl 2-carbamylacrylate, ethyl 2-cyanoacrylate, diethyl 2-methylenemalonate, etc.; and water-soluble alkali metal and ammonium salts, such as sodium acrylate, sodium methacrylate, potassium acrylate, potassium ethacrylate, ammonium acrylate, ammonium methacrylate, sodium 2-carboxyacrylate, sodium 2-carbamylacrylate, sodium ethyl-2-methylenemalonate, etc. These acids and their precursors generically are compounds which under hydrolyzable conditions contain a carboxy group—which conditions are well known to chemists and need not be described in detail herein.

The polymers of this invention can be water-soluble or dispersible polymers prepared by any conventional polymerization procedure, such as emulsion polymerization, solution polymerization, suspension polymerization, or the like. In the preferred method of preparing these polymers, the monomers are prepared by emulsion polymerization whereby the monomers are first emulsified in water containing an emulsifying agent, such as a soap, and polymerization is promoted by a suitable catalyst, such as a redox catalyst system consisting of salts of a persulfate and a sulfite. Satisfactory rates of polymerization in emulsion form can be obtained at temperatures below 100° C. At the end of the reaction, which can be completed in about 1 hour, the polymer can be recovered from the reaction medium by filtration or the like and treated with an alkali, such as sodium hydroxide, or ammonium hydroxide, so as to hydrolyze or saponify the ester groups of the carboxy-forming comonomer or to hydrolyze the nitrile or amide groups of the carboxy-forming comonomer. Preferably, this hydrolysis is effected in the emulsion prior to recovering the polymer. The resulting polymers contain carboxy groups and may be purified. The free acid as well as the salts thereof formed by neutralization, metathesis, ion exchange, etc., are useful in controlling the water loss of drilling fluids. These salts include the water-soluble metal and ammmonium or organic base salts, especially the alkali or alkaline earth metal salts. Other metal salts include aluminum, iron, copper, lead, zinc and other heavy metals, and the like.

It is not essential to hydrolyze the polymer prior to its addition to the drilling fluid. In many cases, this can be effected under the conditions prevailing in the drilling fluid or the latter can be additionally treated to promote or accelerate the hydrolysis. The free acid as well as other water-insoluble salts can be rendered water-soluble or dispersible in situ the drilling fluid.

In polymer chemistry it is common to refer to a copolymer in terms of the weight ratio per 100 parts of total weight of the monomers used to prepare the copolymer. Thus, when 75 parts of monomer A and 25 parts of monomer B are copolymerized, the resulting copolymer can be referred to as a 75/25 copolymer of A and B or a copolymer prepared with 75 parts of A per 100 parts total weight of the monomers. It is understood that the polymer may not contain exactly the same ratio of the two monomer units as was used in the preparation of the polymer. However, it is the practice in the polymer art to base the range for polymer composition on the charge ratio of the monomers rather than on their combined ratio. It is recognized that the combining ratio of monomers varies during the course of the polymerization so that if the polymerization is conducted to 100 percent conversion, the average combining ratio will then be equal to the charge ratio of the monomers. To fully utilize the monomers, it is desirable in the practice of this invention to conduct the polymerization to at least 50 percent conversion of the polymers. A minor amount of the vinyl-substituted heterocyclic nitrogen base monomer is preferably used per 100 parts of the total monomer weight. Generally, definite advantages can be gained by using as little as about 3 parts to at least as much as 50 parts of the heterocyclic nitrogen monomer per 100 parts of total monomer weight. Preferably, about 5 to about 30 parts by weight of the heterocyclic nitrogen base monomer is used per 100 parts of total monomer weight. More than two monomers can be used in the polymerization recipe, that is, terpolymers can be formed as well as copolymers; however, about 3 to 50 parts by weight of the total of the heterocyclic compounds should be used per 100 parts of total monomers.

Although the preferred heterocyclic nitrogen compounds to be used in preparing the polymers of this invention have only one vinyl group attached to the hetero ring, heterocyclic nitrogen compounds having two vinyl groups attached to the hetero ring can be used, preferably along with monovinyl heterocyclic nitrogen compounds when up to 2 percent, preferably less than 0.5 percent, of the divinyl compound is used.

The polymers used in this invention are unique in that the molecules contain both acidic and basic groups so that the polymers can be described as amphoteric. As such, they can be made water-soluble or dispersible (the term dispersible being generic).

Any of the drilling fluids of the aqueous or emulsion types now in use may be treated with the polymers of this invention to control the filtration rate thereof. Drilling fluids which can be so treated include aqueous drilling fluids, usually comprising water, colloidal material of both gel-forming and non gel-forming types and weighting materials suspended in the water. Either salt water or fresh water can be used in making up the drilling fluids and inorganic solid materials, such as bentonitic and other clays, can be suspended in the drilling fluid. Lime treated drilling fluids, low pH and high pH drilling fluids, etc., can also be treated with the polymers of this invention.

Moreover, drilling fluids of the emulsion type, such as oil-in-water emulsions and water-in-oil emulsions can also be treated. These emulsion drilling fluids can be prepared from water and a hydrocarbon fluid such as crude oil, diesel fuel, kerosene, gas oil, heavy fuel oil, various petroleum fractions, blends of such fractions with asphalt or other viscous oil, and the like. These emulsion drilling fluids can be prepared using oil soluble emulsifying agents, such as alkaline earth metal salts of saponifiable oils such as vegetable oils, wood oils and fish oils. Blown or oxidized asphalt and the alkali metal and alkaline earth metal salts of lignin can be used. These emulsion drilling fluids can be prepared by methods well known to those skilled in the art. The amount of hydrocarbon fluid employed in preparing these emulsion drilling fluids will depend upon various considerations such as the type of emulsion desired, the amount of water, the density of the drilling fluid, the nature of the formation penetrated, the amount of emulsifier, and other factors that can be readily determined by those skilled in the art. Generally, for oil-in-water emulsions, the amount of oil component employed will be in the range between about 2 and 40 percent (commonly between about 5 and 20 percent) by volume of the final emulsion. For the water-in-oil systems, the amount of the oil component employed will be in the range between about 20 and 95 percent (commonly between about 40 and 60 percent) by volume of the final emulsion.

The drilling fluids of this invention can contain, in addition to the polymers added according to this invention to control the filtration rate of the drilling fluid, the usual drilling fluid constituents, as for example clay and drilled solids, caustic, quebracho, lime, barite, tannins, polyphosphate, mica, cotton seed hulls, cellophane scrap, and the like. The water-soluble or dispersible polymers of this invention can be added by any convenient manner to the drilling fluid. The polymer can be predissolved or dispersed in water or in water containing other desirable drilling fluid reagents such as sodium hydroxide, sodium carbonate, lignitic shale, quebracho, disodium acid pyrophosphate, etc. A particularly convenient method is to add the polymer additive through a jet mixer or at the suction of the drilling fluid pumps, thereby achieving rapid dispersion and effectiveness. Solutions or suspensions containing the polymer, or the polymer in essentially dry conditions, can be used. The drilling fluids treated in accordance with this invention are circulated during drilling and a new method of drilling is obtained since the drilling fluid has a low filtration rate, desirable viscosity, and other desirable drilling fluid properties which expedite the drilling operation, and thereby increase the recovery of oil or gas.

The amount of polymer to be added to the drilling fluid will depend upon various factors, such as the type of formation penetrated, the type of drilling fluid, the depth of the formation, prior treatment of the drilling fluid and borehole, etc. Accordingly, I prefer to define the limits of amounts of the polymer additive to be employed in the drilling fluids of my invention by functional rather than by actual numerical limits, the amount to be used being that necessary to give the result desired, i.e., a drilling fluid having a relatively low rate of filtration or water loss. An over- or under-dose of the polymer will still be operative but merely does not produce optimum results. In general, polymer added to the drilling fluid in the range from about 0.1 to about 10 pounds of polymer per barrel (42 U.S. gallons) of drilling fluid will be adequate. Beneficial effects can, however, be achieved using concentrations of polymer higher than 10 pounds per barrel, for example 25 pounds per barrel, particularly when it is desired to minimize dispersion of shales or when the drilling fluid contains low concentrations (i.e., less than 5–10 percent by weight) of clay materials.

The following specific examples set forth hereinafter are illustrative of this invention and specific details for operating the present invention are described with comparative results showing the advantages to be obtained by this invention. However, these examples do not unduly limit this invention and merely illustrate preferred embodiments thereof.

EXAMPLE I

Polymers were prepared by emulsion polymerization of methyl acrylate with 0, 5.0, 10, 20, 25, 30, 40, or 50 parts of 2-methyl-5-vinylpyridine per 100 parts of total monomers. The recipes used in the preparation of these polymers are given in Table I.

Table I
RECIPES USED FOR PREPARATION OF THE POLYMERS

| Ingredient | Parts by weight | | | | | | | | |
|---|---|---|---|---|---|---|---|---|---|
| Water | 500 | 500 | 500 | 500 | 500 | 500 | 500 | 500 | 500 |
| Methyl acrylate | 100 | 97.5 | 95 | 90 | 80 | 75 | 70 | 60 | 50 |
| 2-methyl-5-vinvylpyridine | 0 | 2.5 | 5.0 | 10 | 20 | 25 | 30 | 40 | 50 |
| Sulfonated castor oil | 1.0 | 1.0 | 1.0 | 1.0 | 1.0 | 1.0 | 1.0 | 1.0 | 1.0 |
| Potassium persulfate | 1.0 | 1.0 | 1.0 | 1.0 | 1.0 | 1.0 | 1.0 | 1.0 | 1.0 |
| Sodium acid sulfite | 1.0 | 1.0 | 1.0 | 1.0 | 1.0 | 1.0 | 1.0 | 1.0 | 1.0 |
| Acetic acid (glacial) | 0.0 | 2.0 | 5.1 | 11.2 | 22.4 | 28.0 | 33.6 | 45 | 56 |

The ingredients for the preparation of each polymer were added to a flask, stirred and heated to a temperature of about 60° C. Heating was terminated and the heat of reaction increased the temperature to a maximum value of about 85° C. At the end of one hour, the polymerization was essentially complete and a solution containing sodium hydroxide was added to effect saponification of the ester and to neutralize the acetic acid. The amount of alkali used was equivalent to the amount of ester and acetic acid. The mixture was heated for 3 hours at 80° C. to effect saponification. The total solids in the resulting viscous solution was determined by drying an aliquot of the solution at 105° C. From the value for the total solids and the computed ratio of the polymer to salts in the solids, the percent by weight of the polymer in solution was computed.

The solutions containing the polymers were used to prepare salt water drilling fluids. Each drilling fluid sample was prepared in the following manner: sufficient polymer solution was taken to give 3.0 g. of polymer, and the solution was diluted with water. The amount of water used was computed to give a 350 ml. total volume of the prepared drilling fluid after addition of attapulgite clay (14.1 g.) and of sodium chloride (17.1 g.), respectively. The mixture was vigorously stirred for 30 minutes. The drilling fluid was then placed in a Mason jar and aged for 16 hours at 80° C. At the end of the aging period the drilling fluid was cooled to room temperature, stirred for about 15 minutes and tested according to the procedure described in "Recommended Practice on Field Procedure for Testing Drilling Fluids," A.P.I. Code No. 29.

The water-loss and the pH values of the drilling fluids are reported in Table II. The apparent viscosities were determined with a Fann V–G Meter.

Table II

| 2-methyl-5-vinyl-pyridine, percent by weight of total monomers | API Code No. 29 properties | | Apparent viscosity, cp. |
|---|---|---|---|
| | pH | Water loss, ml. | |
| 0 | 9.0 | 55 | 3 |
| 2.5 | 8.0 | 74 | |
| 5.0 | 9.0 | 32 | 3 |
| 10 | 8.7 | 10 | 4 |
| 20 | 8.7 | 15 | 6 |
| 25 | 9.5 | 15 | 34 |
| 30 | 8.6 | 34 | 3 |
| 40 | 9.6 | 45 | 14 |
| 50 | 9.3 | 37 | 4 |

The results reported in Table II illustrate the benefits to be gained by using the copolymers of this invention. These results show that optimum results for water loss control were obtained when the polymer was prepared from the mixture containing 10 parts by weight of the heterocyclic nitrogen monomer; however, desirable properties were obtained with those polymers prepared with from about 3 to 50 parts by weight of the heterocyclic nitrogen monomer.

EXAMPLE II

For purposes of comparison, a saponified 90/10 methyl acrylate/styrene polymer was prepared and a salt water drilling fluid treated therewith. This polymer was prepared from the following recipe.

Table III

| Ingredient: | Parts by weight |
|---|---|
| Water | 450 |
| Methyl acrylate | 10 |
| Styrene | 1.0 |
| Potassium persulfate | 1.0 |
| Sulfonated caster oil | 1.0 |
| Sodium acid sulfite | 0.5 |
| Dodecyl mercaptan | 0.01 |

The first five ingredients were heated at 50° C. with stirring for 1½ hours, after which the acid sulfite and mercaptan were added. The heat of reaction raised the temperature of the mixture to 85° C. and after an hour at this temperature, 40 g. of sodium hydroxide was added to effect saponification in situ. Heating was continued at 85° C. for 2 hours.

Three samples of the above prepared polymer solution (each containing 3 g. of saponified 90/10 methyl acrylate/styrene) were added to three salt water drilling fluids in the manner described in Example I. The water loss properties of these drilling fluids (as determined by A.P.I. Code No. 29) are set forth in Table IV and compared with that of the drilling fluid treated with the sodium salt of a saponified 90/10 methyl acrylate/2-methyl-5-vinylpyridine polymer of Example I.

Table IV

| Polymer added | pH | Water loss, ml. | Apparent viscosity, cp. |
|---|---|---|---|
| 90/10 acrylate/styrene | 8.7 | 50.3 | 3 |
| Do | 9.3 | 50.1 | 4 |
| Do | 10.7 | 60.2 | 4 |
| 90/10 acrylate/2-methyl-5-vinylpyridine | 8.7 | 10 | 4 |

The superiority of the vinyl-substituted heterocyclic copolymer of this invention as a water loss controlling additive over that of an acrylate/styrene copolymer is quite evident from Table IV.

EXAMPLE III

In this example, comparative tests were made on drilling fluids containing in one case a commercial polymer sold for use in drilling fluids, i.e., Cypan, a polyacrylate, and a polymer of this invention, i.e., a saponified 95/5 acrylonitrile/2-methyl-5-vinylpyridine polymer.

The saponified 95/5 acrylonitrile/2-methyl-5-vinylpyridine polymer was prepared by emulsion polymerization using the following recipe.

Table V

| Ingredient: | Parts by weight |
|---|---|
| Water | 450 |
| Fatty acid soap | 2.5 |
| Acrylonitrile | 47.5 |
| 2-methyl-5-vinylpyridine | 2.5 |
| Potassium persulfate | 0.5 |
| Dodecyl mercaptan | 0.05 |

The reactants were charged to a quart-size bottle which was agitated in a constant temperature bath at 40° C.

After 18 hours the reaction mixture was diluted with approximately an equal volume of isopropyl alcohol and stirred for 15 to 20 minutes. The coagulated polymer was recovered by filtration. The moist cake of copolymer was air-dried at about 55° C. A portion (41 g.) of the product was placed in a liter flask containing 27 g. of sodium hydroxide dissolved in about 500 cc. of water. The mixture was heated 3–4 hours at 85° C. to effect saponification. During saponification the off-white polymer changed to a deep red color and eventually dissolved to give a light amber solution. Inherent viscosity of the product in water was 11.7.

Thirty g. of the aforementioned polymer solution, containing 3 g. of the saponified 95/5 acrylonitrile/2-methyl-5-vinylpyridine polymer, was added to 307 ml. of water which had been mixed with 14.1 g. of attapulgite clay and 17.4 g. of sodium chloride. The salt water drilling fluid was aged for 16 hours at 80° C. The water loss value of the drilling fluid was determined by filtering the drilling fluid at 85° C., maintaining the filter press at this temperature by means of a surrounding bath. The filtration rate observed after 30 minutes, while applying a pressure of 100 p.s.i.g., was doubled in order to correct for the area of the filter press and thereby make the dimensions comparable to that stated in A.P.I. Code No. 29 for tests conducted at ambient temperatures. Results are given in Table VI.

A drilling fluid containing the commercial polyacrylate, Cypan, was prepared in a manner analogous to that described for the preparation of drilling fluid containing the 95/5 copolymer except that the polyacrylate was a dry salt and therefore 335 ml. of water was used in preparing the drilling fluid. A control sample of drilling fluid was prepared in a similar manner (with no polymer added), containing 4.1 g. of attapulgite clay and 17.4 g. of sodium chloride in 337 ml. of water. Filtration rates of the drilling fluid containing the polyacrylate and the control were obtained in a similar manner at a temperature of 85° C. and the results obtained are also set forth in Table VI for purposes of comparison.

*Table VI*

Polymer added: Water loss (ml.)
- None (control) _____ 184
- Polyacrylate (Cypan) _____ 55.2
- Acrylonitrile/2-methyl-5-vinylpyridine _____ 15.6

The marked advantage of using a polymer of vinyl-substituted heterocyclic nitrogen/carboxyl comonomer over a commercial polymer of polyacrylate in controlling the water loss of a drilling fluid is evident from Table VI.

EXAMPLE IV

A sodium polyacrylate, similar to that often used in drilling fluids of the prior art, and a copolymer, acrylic acid/N-vinylpyrrolidone, described by this invention, were prepared by emulsion polymerization using the following recipes.

*Table VII*

| Ingredient | Parts by weight for— | |
|---|---|---|
| | Polyacrylate | Acrylic acid; N-vinylpyrrolidone |
| Water | 500 | 500 |
| Methyl acrylate | 100 | 0 |
| Acrylic acid | 0 | [1] 75 |
| N,vinylpyrrolidone | 0 | 10 |
| Sulfonated castor oil | 1.0 | 0.0 |
| Potassium persulfate | 1.0 | 1.0 |
| Sodium acid sulfite | 1.0 | 1.0 |

[1] Seventy-five parts of acrylic acid are chemically equivalent to 90 parts of methyl acrylate.

Each polymer was prepared by placing the ingredients in a flask, stirred then heating to 60° C. to initiate polymerization. Heating was then terminated, but the reaction continued as evidenced by the increase in temperature of the mixture to about 80° C. After completion of the polymerization of the polyacrylate, sodium hydroxide was added in an amount equivalent to the ester and the ester saponified by heating the mixture to about 80° C. for 3 hours. The acrylic acid/N-vinylpyrrolidone did not require saponification to form free carboxyl groups since acrylic acid was used as the comonomer. The reaction mixtures containing the polymers were used to prepare drilling fluids.

The effects of each of the polymers on two types of drilling fluids were determined, viz., a fresh water drilling fluid and a salt water drilling fluid. The fresh water drilling fluid contained McCracken clay, a native clay mined near McCracken, Kansas; the concentration of the clay was about 20 percent by weight of the drilling fluid. A polymer solution containing about 1 to 3 g. of the polymer (dry basis) was added to the clay suspension and sufficient water was then added together with sodium hydroxide so that the total volume was 350 ml.

The salt water drilling fluids were prepared in a similar manner using comparable amounts of polymer solution, 14.1 g. of attapulgite clay and 17.4 g. of sodium chloride per 350 ml. of drilling fluid. Both types of drilling fluids were stirred to disperse the clay. These drilling fluids were sealed in Mason jars and aged at 80° C. for 16 hours. After aging, the drilling fluids were cooled, stirred 30 minutes and tested in accordance with the procedure of A.P.I. Code No. 29, along with suitable control samples of drilling fluid. The results obtained are given in Table VIII. For these determinations, comparison was made with the polyacrylate salt and acrylic acid/N-vinylpyrrolidone polymer of this invention using drilling fluids having closely comparable pH values. These pH values were determined with an electronic pH meter using a calomel and glass electrode system carefully calibrated with standard buffer solutions and compensated for temperatures.

*Table VIII*

| Polymer added | Fresh water drilling fluid | | | | | Salt water drilling fluid | | | | |
|---|---|---|---|---|---|---|---|---|---|---|
| | Polymer, lb./bbl. | NaOH, lb./bbl. | pH | Water loss, ml. | Apparent viscosity, cp. | Polymer, lb./bbl. | NaOH, lb./bbl. | pH | Water loss, ml. | Apparent viscosity, cp. |
| None (control) | 0 | 0 | 6.38 | 54.5 | | 0 | 0 | | 184 | |
| Sodium polyacrylate [1] | 1 | 0 | 6.78 | 39 | 11 | 3 | 0 | 9.01 | 55 | 3 |
| Do.[1] | 3 | 1.5 | 9.1 | 3.7 | 18 | | | | | |
| Do.[1] | 3 | 0 | | 3.7 | 11 | | | | | |
| Do.[2] | 1 | 0 | 6.8 | 30.2 | 14 | 3 | 0.3 | 9.0 | 21.6 | 3 |
| Do.[2] | 3 | 1 | 9.2 | 2.6 | 22 | | | | | |
| Acrylic acid/N-vinylpyrrolidone | 1 | 1.5 | 6.7 | 2.5 | 16 | 3 | 1.6 | 9.10 | 13.5 | 4 |
| Do | 3 | 2.0 | 9.01 | 2.4 | 46 | | | | | |
| Do | 3 | 1.5 | 7.12 | 2.8 | 41 | | | | | |

[1] Prepared by saponification of poly(methyl acrylate).
[2] Prepared by neutralization of polyacrylic acid.

These results show the improvement in water loss control which can be achieved by using a polymer prepared from a vinyl-substituted heterocyclic nitrogen base compound, e.g., N-vinylpyrrolidone, and a carboxy containing comonomer having a terminal vinyl group, e.g., acrylic acid. This improvement leads to a substantial economy in concentration polymer and is particularly pronounced in salt water drilling fluids.

Various modifications and alterations of this invention will become apparent to those skilled in the art without departing from the scope and spirit of this invention. The foregoing discussion and examples merely illustrate preferred embodiments of this invention and do not unduly limit the same.

I claim:

1. In a process of drilling a well with well drilling tools, the steps of circulating in said well a drilling fluid to which has been added a minor but sufficient amount to substantially reduce the filtration rate of said drilling fluid of a polymer prepared by polymerizing a vinyl-substituted heterocyclic nitrogen compound and a comonomer having a terminal vinyl group and under hydrolyzing conditions contains a carboxy group.

2. The process according to claim 1 wherein the amount of said heterocyclic nitrogen compound used in preparing said polymer is in the range from about 3 to about 50 parts per 100 parts of total monomer weight.

3. The process according to claim 1 wherein said heterocyclic nitrogen compound has the formula:

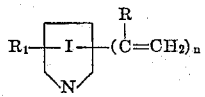

where I is a ring selected from the group consisting of saturated and unsaturated hetero rings, $n$ is a positive integer from 1 to 2, R is selected from the group consisting of H and $CH_3$, and $R_1$ is selected from the group consisting of H, alkyl groups having not more than 12 carbon atoms in the total of said $R_1$ groups, an oxygen atom attached by a double bond to one of the carbon atoms in said hetero rings, and those non-metallic atoms necessary to complete from 1 to 2 benzoid structures each of which is completed in part with any pair of vicinal carbon atoms in said hetero rings.

4. The process according to claim 1 wherein acid heterocyclic nitrogen compound has the formula:

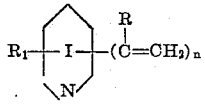

where I is a ring selected from the group consisting of saturated and unsaturated hetero rings, $n$ is a positive integer from 1 to 2, R is selected from the group consisting of H and $CH_3$, and $R_1$ is selected from the group consisting of H, alkyl groups having not more than 12 carbon atoms in the total of said $R_1$ groups, an oxygen atom attached by a double bond to one of the carbon atoms in said hetero rings, and those non-metallic atoms necessary to complete from 1 to 2 benzoid structures each of which is completed in part with any pair of vicinal carbon atoms in said hetero rings.

5. In a process of drilling a well with well drilling tools, the steps of circulating in said well a drilling fluid which forms a filter cake on the wall of said well, the steps of treating said drilling fluid by adding to the same a minor but sufficient amount to reduce the filtration rate of said drilling fluid of a polymer prepared by polymerizing a vinyl-substituted heterocyclic nitrogen compound and a comonomer having the formula:

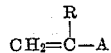

where R is selected from the group consisting of H, lower alkyl, Cl, COOH, CN, $CONH_2$, COOR' and $CH_2COOR'$, said R' being a lower alkyl, and A is selected from the group consisting of COOH, CN, $CONH_2$, COOR'', and COOM, said R'' being a lower alkyl, and said M being a monovalent salt forming radical selected from the group consisting of alkali metal and ammonium radicals.

6. The process according to claim 5 wherein said heterocyclic nitrogen compound has the formula:

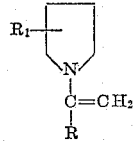

where R is selected from the group consisting of H and $CH_3$, and $R_1$ is selected from the group consisting of H and alkyl groups having not more than 12 carbon atoms in the total of said $R_1$.

7. The process according to claim 5 wherein said heterocyclic nitrogen compound has the formula:

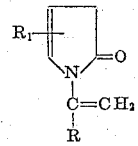

where R is selected from the group consisting of H and $CH_3$, and $R_1$ is selected from the group consisting of H and alkyl groups having not more than 12 carbon atoms in the total of said $R_1$.

8. The process according to claim 5 wherein said heterocyclic nitrogen compound has the formula:

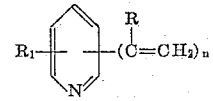

where $n$ is a positive integer from 1 to 2, R is selected from the group consisting of H and $CH_3$, and $R_1$ is selected from the group consisting of H and alkyl groups having not more than 12 carbon atoms in the total of said $R_1$.

9. The process according to claim 5 wherein said heterocyclic nitrogen compound has the formula:

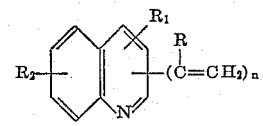

where $n$ is a positive integer from 1 to 2, R is selected from the group consisting of H and $CH_3$, and $R_1$ is selected from the group consisting of H and alkyl groups having not more than 12 carbon atoms in the total of said $R_1$.

10. The process according to claim 5 wherein said heterocyclic nitrogen compound has the formula:

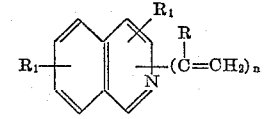

where $n$ is a positive integer from 1 to 2, R is selected from the group consisting of H and $CH_3$, and $R_1$ is selected from the group consisting of H and $CH_3$, and $R_1$ is selected from the group consisting of H and alkyl groups having not more than 12 carbon atoms in the total of said $R_1$.

11. The process according to claim 5 wherein the amount of said heterocyclic nitrogen compound used in preparing said polymer is in the range from about 3 to about 50 parts per 100 parts of total monomer weight.

12. The process according to claim 11 wherein said drilling fluid is of the aqueous type.

13. The process according to claim 11 wherein said drilling fluid is of the fresh water type containing suspended clayey materials.

14. The process according to claim 11 wherein said drilling fluid is of the oil-in-water emulsion type.

15. In a process of drilling a well with well drilling tools, the steps of circulating in said well a salt water drilling fluid containing suspended clayey materials which form a filter cake on the wall of said well, the steps of treating said drilling fluid by adding to the same a minor but sufficient amount to reduce the filtration rate of said drilling fluid of a polymer prepared by polymerizing a vinyl-substituted heterocyclic nitrogen compound and a comonomer having the formula:

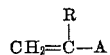

where R is selected from the group consisting of H, lower alkyl, Cl, COOH, CN, CONH₂ COOR' and CH₂COOR', said R' being a lower alkyl, and A is selected from the group consisting of COOH, CN, CONH₂, COOR", and COOM, said R" being a lower alkyl, and said M being a monovalent salt forming radical selected from the group consisting of alkali metal and ammonium radicals, wherein the amount of said heterocyclic nitrogen compound used in preparing said polymer is in the range from about 3 to about 50 parts per 100 parts of total monomer weight.

16. The process according to claim 15 wherein said polymer is the sodium salt of a saponified 95/5 copolymer of acrylonitrile and 2-methyl-5-vinylpyridine.

17. In a process of drilling a well with well drilling tools, the steps of circulating in said well an emulsion drilling fluid containing oil and salt water, the steps of treating said drilling fluid by adding to the same a minor but sufficient amount to reduce the filtration rate of said drilling fluid of a polymer prepared by polymerizing a vinyl-substituted heterocyclic nitrogen compound and a comonomer having the formula:

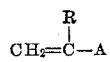

where R is selected from the group consisting of H, lower alkyl, Cl, COOH, CN, COHN₂, COOR' and CH₂COOR', said R' being a lower alkyl, and A is selected from the group consisting of COOH, CN, CONH₂, COOR", and COOM, said R" being a lower alkyl, and said M being a monovalent salt forming radical selected from the group consisting of alkali metal and ammonium radicals, wherein the amount of said heterocyclic nitrogen compound used in preparing said polymer is in the range from about 3 to about 50 parts per 100 parts of total monomer weight.

18. The process according to claim 17 wherein said polymer is the sodium salt of a saponified 95/5 copolymer of acrylonitrile and 2-methyl-5-vinylpyridine.

19. In a process of drilling a well with well drilling tools, the steps of circulating in said well a drilling fluid comprising salt water and to which has been added a minor but sufficient amount to substantially reduce the filtration rate of said drilling fluid of a polymer prepared by polymerizing a vinyl-substituted heterocyclic nitrogen compound and a comonomer having a terminal vinyl group and under hydrolyzing conditions contains a carboxy group.

20. A well drilling fluid containing a minor but sufficient amount to substantially reduce the filtration rate of said drilling fluid of a polymer prepared by polymerizing a vinyl-substituted heterocyclic nitrogen compound and a comonomer having a terminal vinyl group and selected from the group consisting of carboxy-containing compounds and their hydrolyzable carboxy-yielding precursors.

21. A well drilling fluid according to claim 20 wherein said heterocyclic nitrogen base compound has the formula:

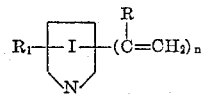

where I is a ring selected from the group consisting of saturated and unsaturated hetero rings, $n$ is a positive integer from 1 to 2, R is selected from the group consisting of H and CH₃, and R₁ is selected from the group consisting of H, alkyl groups having not more than 12 carbon atoms in the total of said R₁ groups, an oxygen atom attached by a double bond to one of the carbon atoms in said hetero rings, and those non-metallic atoms necessary to complete from 1 to 2 benzoid structures each of which is completed in part with any pair of vicinal carbon atoms in said hetero rings.

22. A well drilling fluid according to claim 20 wherein said heterocyclic nitrogen base compound has the formula:

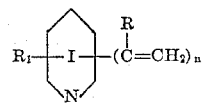

where I is a ring selected from the group consisting of saturated and unsaturated hetero rings, $n$ is a positive integer from 1 to 2, R is selected from the group consisting of H and CH₃, and R₁ is selected from the group consisting of H, alkyl groups having not more than 12 carbon atoms in the total of said R₁ groups, an oxygen atom attached by a double bond to one of the carbon atoms in said hetero rings, and those non-metallic atoms necessary to complete from 1 to 2 benzoid structures each of which is completed in part with any pair of vicinal carbon atoms in said hetero rings.

23. The well drilling fluid according to claim 20 wherein the amount of said heterocyclic nitrogen compound used in preparing said polymer is in the range from about 3 to about 50 parts per 100 parts of total monomer weight.

24. The well drilling fluid according to claim 20 wherein said drilling fluid is of the aqueous type.

25. The well drilling fluid according to claim 20 wherein said drilling fluid is of the fresh water type containing suspended clayey materials.

26. The well drilling fluid according to claim 20 wherein said drilling fluid is of the oil-in-water emulsion type.

27. The well drilling fluid according to claim 20 wherein said polymer is acrylate/N-vinylpyrrolidone.

28. The well drilling fluid according to claim 20 wherein said comonomer is represented by the formula:

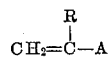

where R is selected from the group consisting of H, lower alkyl, Cl, COOH, CN, CONH₂, COOR', and CH₂COOR', said R' being a lower alkyl, and A is selected from the group consisting of COOH, CN, CONH₂, COOR", and COOM, said R" being a lower alkyl, and said M being a mono-valent salt forming radical selected from the group consisting of alkali metal and ammonium radicals.

29. The well drilling fluid according to claim 28 wherein said heterocyclic nitrogen compound has the formula:

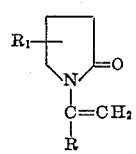

where R is selected from the group consisting of H and CH₃, and R₁ is selected from the group consisting of H and alkyl groups having not more than 12 carbon atoms in the total of said R₁.

30. The well drilling fluid according to claim 28 wherein said heterocyclic nitrogen compound has the formula:

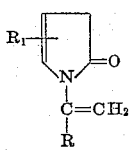

where R is selected from the group consisting of H and $CH_3$, and $R_1$ is selected from the group consisting of H and alkyl groups having not more than 12 carbon atoms in the total of said $R_1$.

31. The well drilling fluid according to claim 28 wherein said heterocyclic nitrogen compound has the formula:

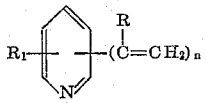

where $n$ is a positive integer from 1 to 2, R is selected from the group consisting of H and $CH_3$, and $R_1$ is selected from the group consisting of H and alkyl groups having not more than 12 carbon atoms in the total of said $R_1$.

32. The well drilling fluid according to claim 28 wherein said heterocyclic nitrogen compound has the formula:

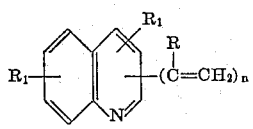

where $n$ is a positive integer from 1 to 2, R is selected from the group consisting of H and $CH_3$, and $R_1$ is selected from the group consisting of H and alkyl groups having not more than 12 carbon atoms in the total of $R_1$.

33. The well drilling fluid according to claim 28 wherein said heterocyclic nitrogen compound has the formula:

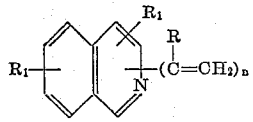

where $n$ is a positive integer from 1 to 2, R is selected from the group consisting of H and $CH_3$, and $R_1$ is selected from the group consisting of H and alkyl groups having not more than 12 carbon atoms in the total of $R_1$.

34. A well drilling fluid containing an acrylate/N-vinylpyrrolidone polymer in an amount from about 0.1 to 10 pounds per barrel, said polymer being prepared with from about 3 to 50 parts of N-vinylpyrrolidone per 100 parts of total monomeric weight.

35. A well drilling fluid containing an acrylate/2-methyl-5-vinylpyridine polymer in an amount from about 0.1 to 10 pounds per barrel, said polymer being prepared with from about 3 to 50 parts of 2-methyl-5-vinylpyridine per 100 parts of total monomeric weight.

36. A salt water well drilling fluid containing suspended clayey material and a minor but sufficient amount to substantially reduce the filtration rate of said drilling fluid of a polymer prepared by polymerizing a vinyl-substituted heterocyclic nitrogen compound and a comonomer having a terminal vinyl group and selected from the group consisting of carboxy-containing compounds and their hydrolyzable carboxy-yielding precursors.

37. The drilling fluid according to claim 36 wherein said polymer is the sodium salt of a saponified 95/5 copolymer of acrylonitrile and 2-methyl-5-vinylpyridine.

38. An emulsion well drilling fluid containing oil and salt water and a minor but sufficient amount to substantially reduce the filtration rate of said drilling fluid of a polymer prepared by polymerizing a vinyl-substituted heterocyclic nitrogen compound and a comonomer having a terminal vinyl group and selected from the group consisting of carboxy-containing compounds and their hydrolyzable carboxy-yielding precursors.

39. A well drilling fluid containing salt water and a minor but sufficient amount to substantially reduce the filtration rate of said drilling fluid of a polymer prepared by polymerizing a vinyl-substituted heterocyclic nitrogen compound and a comonomer having a terminal vinyl group and selected from the group consisting of carboxy-containing compounds and their hydrolyzable carboxy-yielding precursors.

References Cited in the file of this patent
UNITED STATES PATENTS

| | | |
|---|---|---|
| 2,718,497 | Oldham et al. | Sept. 20, 1955 |
| 2,795,545 | Gluesenkamp | June 11, 1957 |

UNITED STATES PATENT OFFICE
CERTIFICATE OF CORRECTION

Patent No. 3,025,234                          March 13, 1962

Peter J. Canterino

It is hereby certified that error appears in the above numbered patent requiring correction and that the said Letters Patent should read as corrected below.

Column 12, lines 8 to 14, the formula should appear as shown below instead of as in the patent:

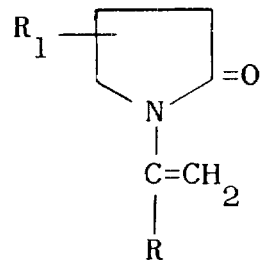

column 13, line 43, for "COHN$_2$" read -- CONH$_2$ --.

Signed and sealed this 14th day of August 1962.

(SEAL)
Attest:
ERNEST W. SWIDER                                            DAVID L. LADD
Attesting Officer                                                Commissioner of Patents